July 2, 1957  W. G. ROWELL  2,798,214
CHECKING TECHNIQUE AND SYSTEM
Filed April 23, 1954  13 Sheets-Sheet 2

INVENTOR.
WILLIAM G. ROWELL
BY Rines and Rines
ATTORNEYS

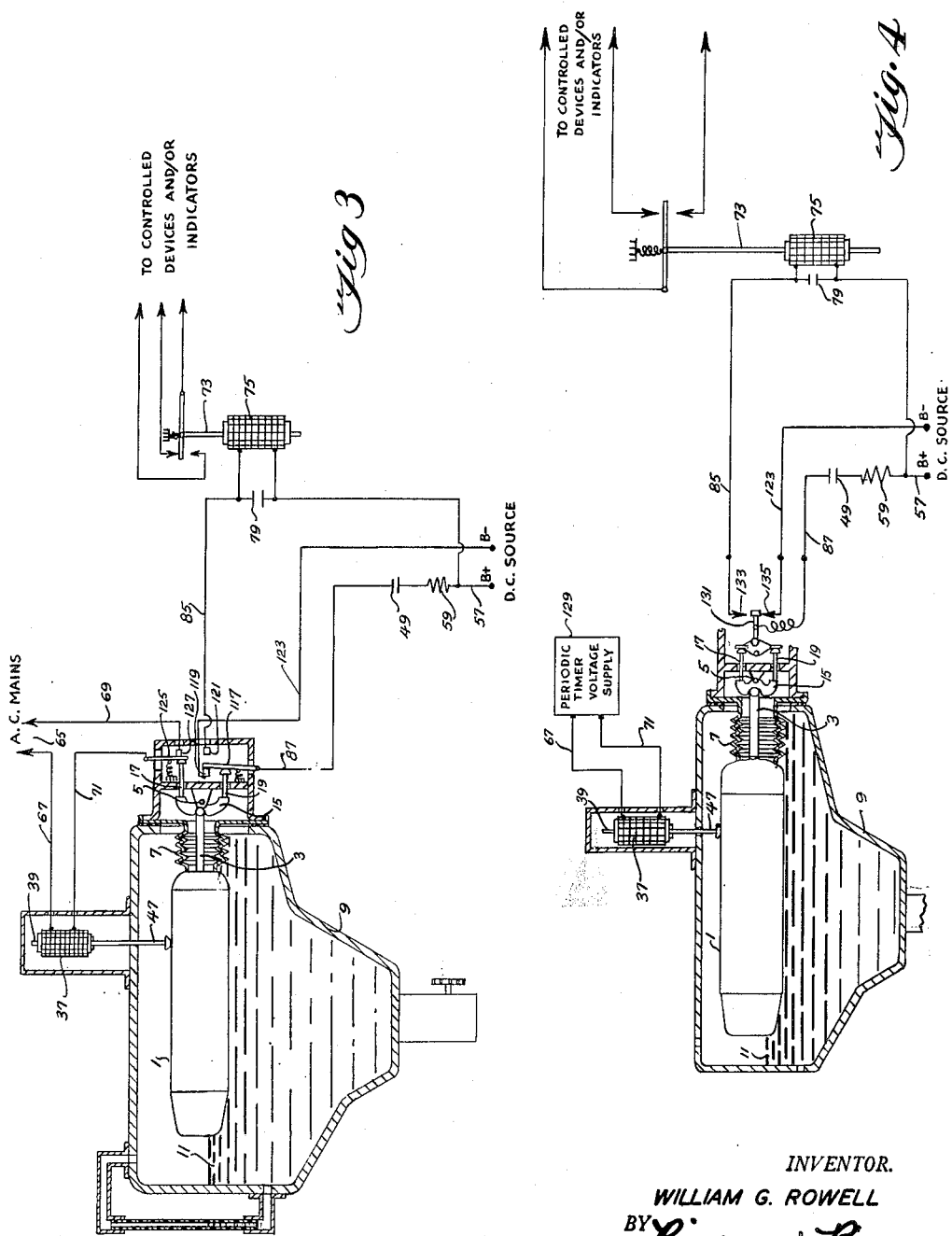

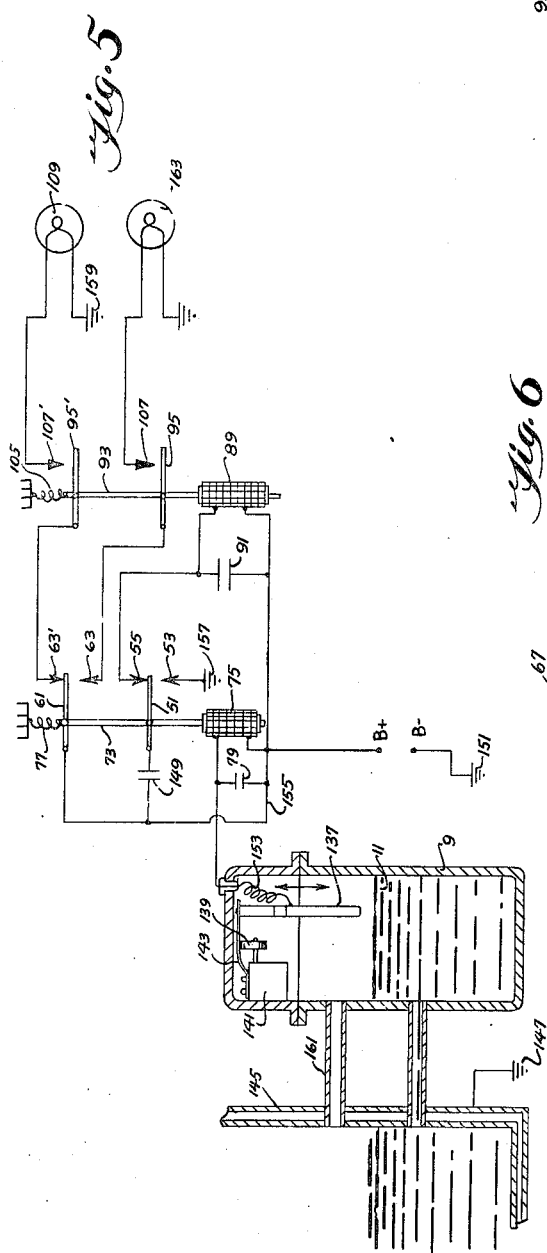

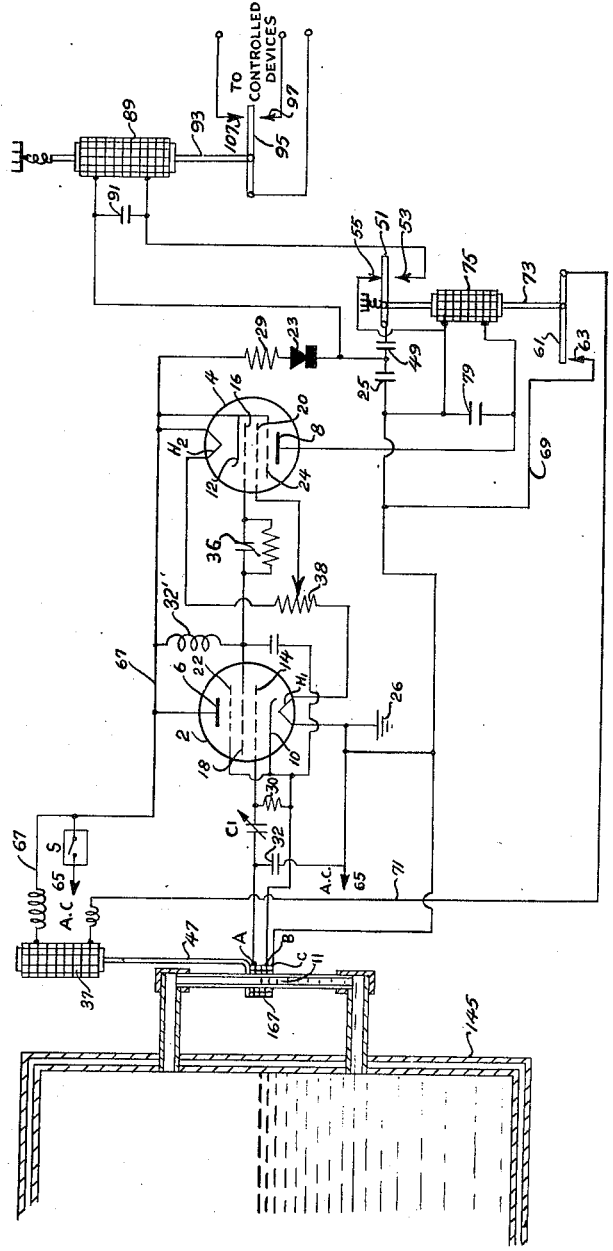

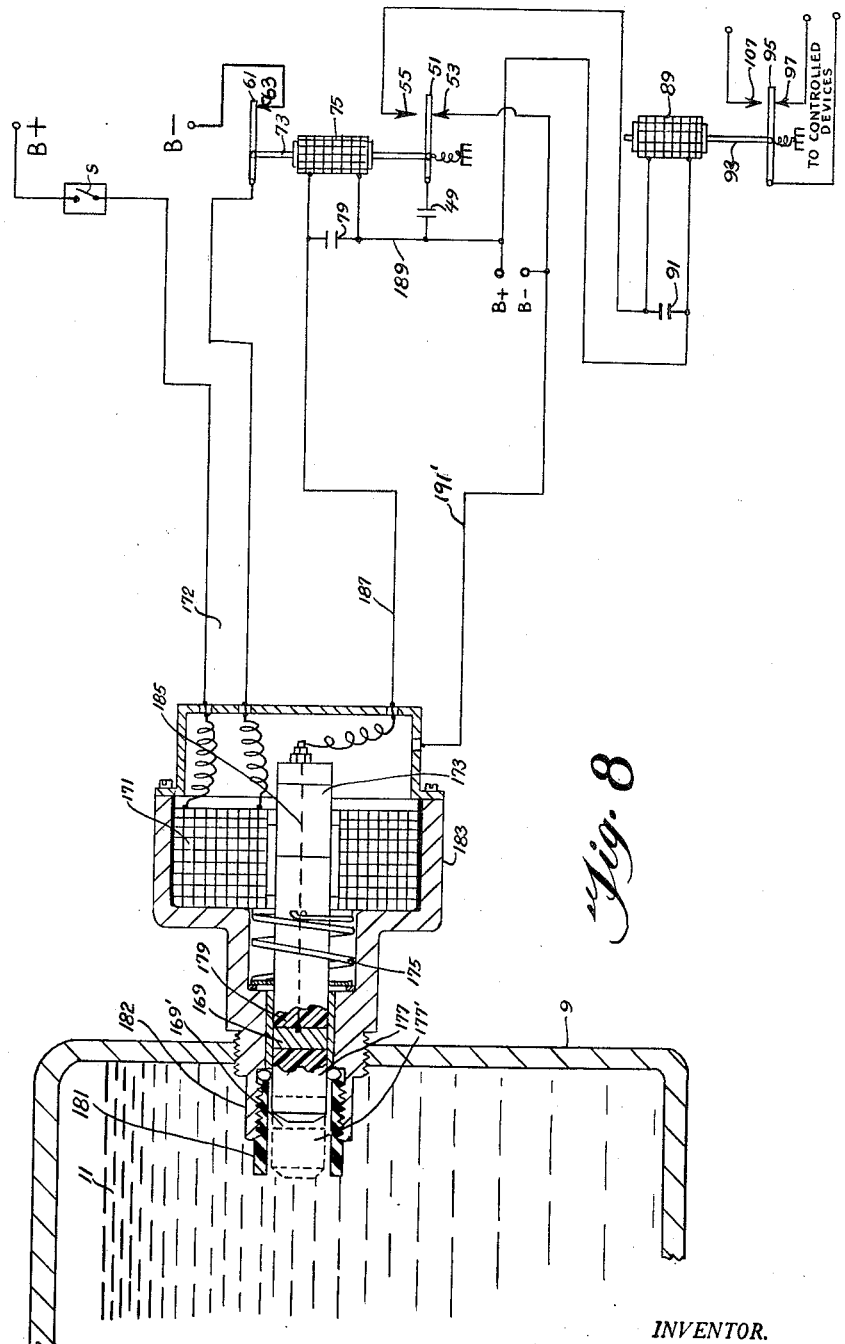

July 2, 1957  W. G. ROWELL  2,798,214
CHECKING TECHNIQUE AND SYSTEM
Filed April 23, 1954  13 Sheets-Sheet 7
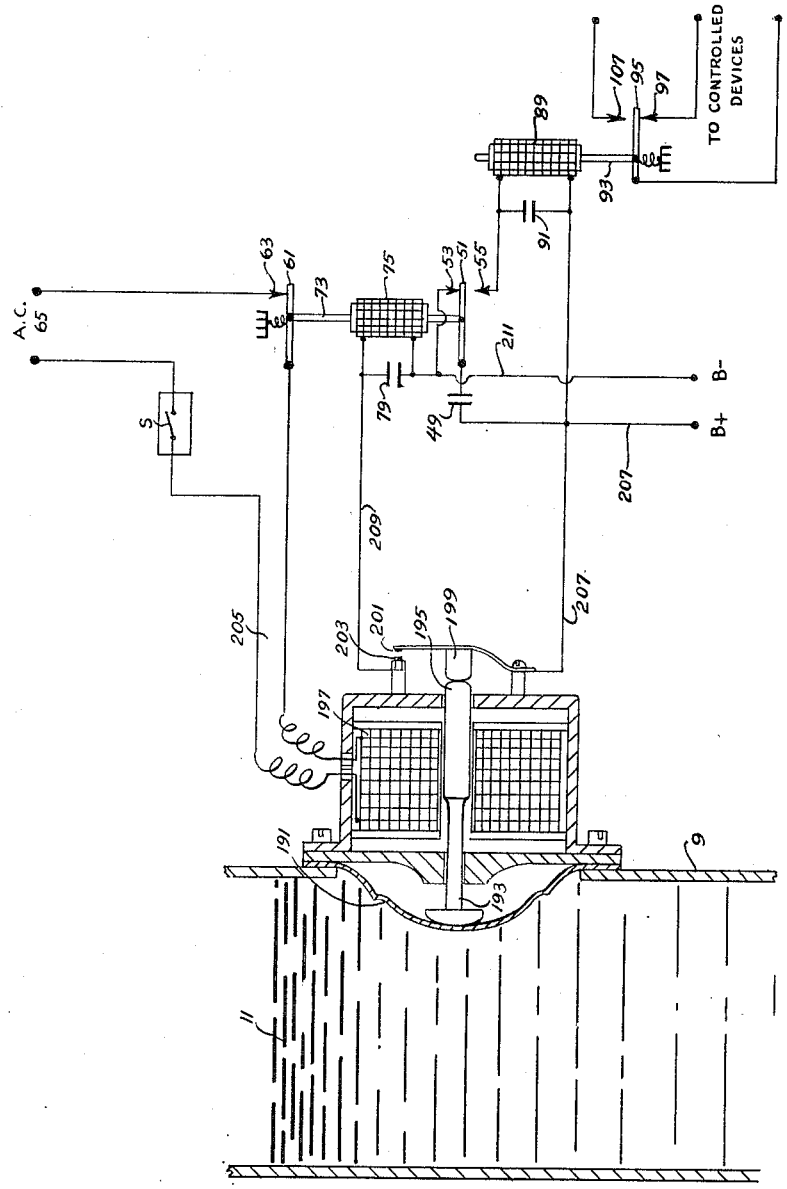
INVENTOR.
WILLIAM G. ROWELL
BY Rines and Rines
ATTORNEYS July 2, 1957  W. G. ROWELL  2,798,214
CHECKING TECHNIQUE AND SYSTEM
Filed April 23, 1954  13 Sheets-Sheet 8

INVENTOR.
WILLIAM G. ROWELL
BY *Rines and Rines*
ATTORNEYS

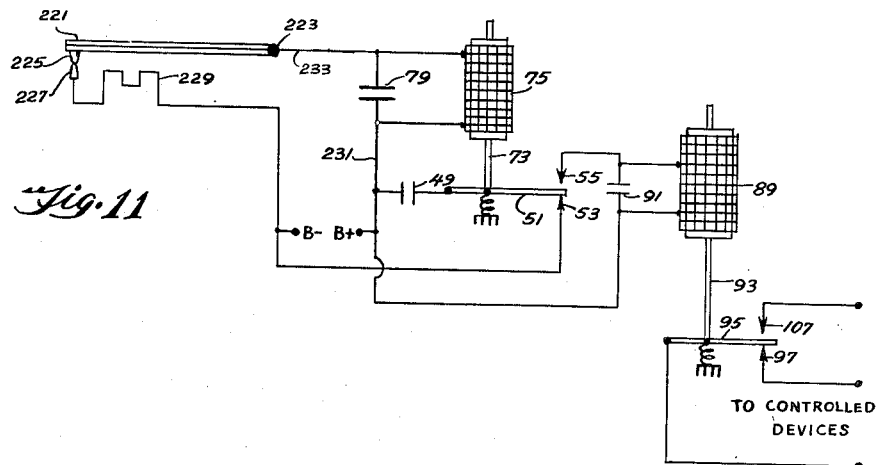
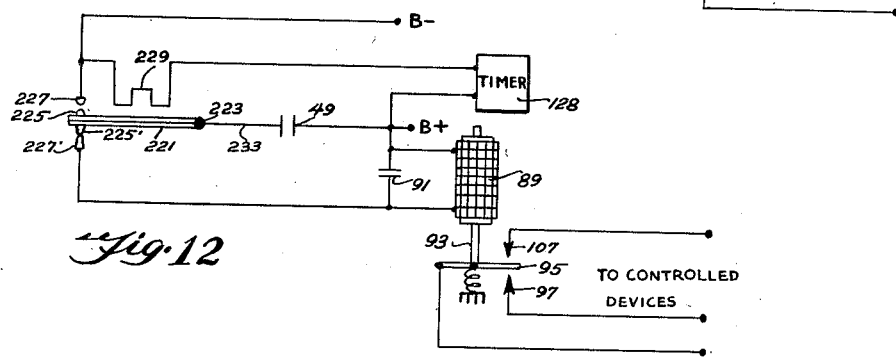
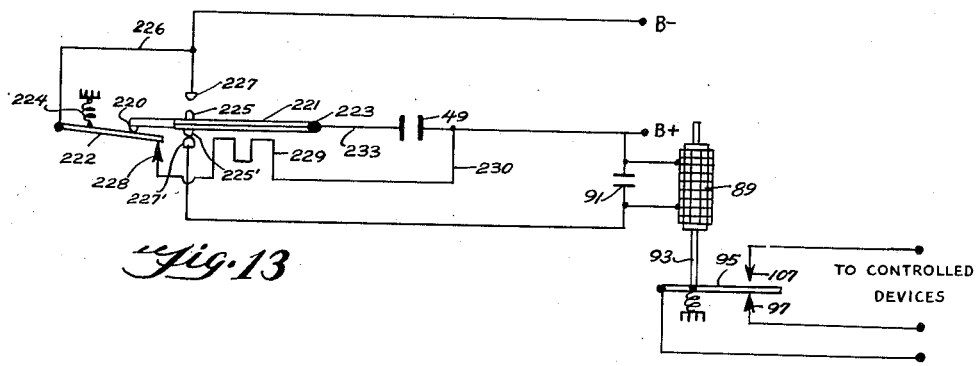

July 2, 1957
W. G. ROWELL
2,798,214
CHECKING TECHNIQUE AND SYSTEM
Filed April 23, 1954
13 Sheets-Sheet 10
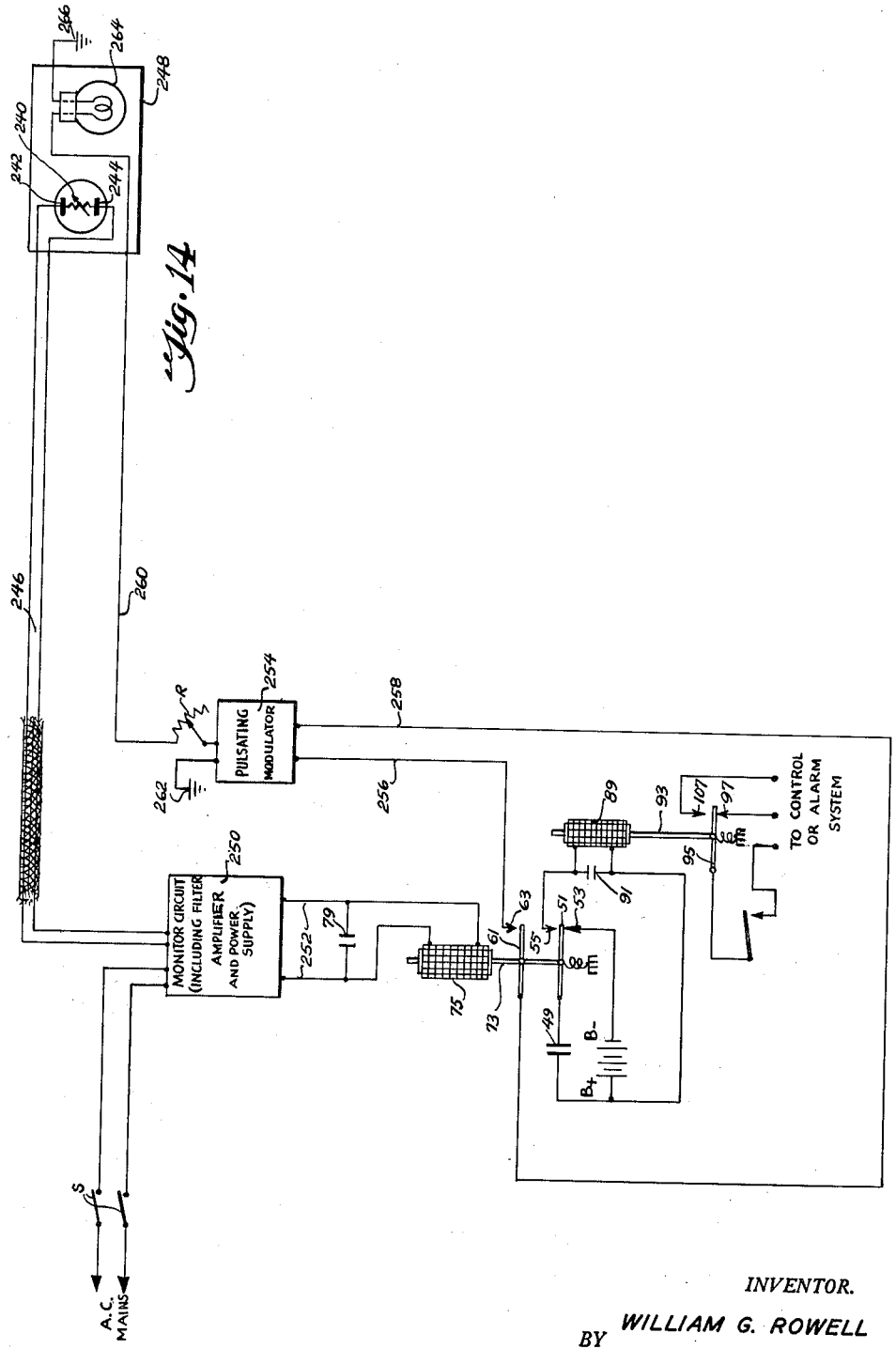
INVENTOR.
WILLIAM G. ROWELL
BY
Rines and Rines
ATTORNEYS

INVENTOR.
WILLIAM G. ROWELL

BY Rines and Rines

ATTORNEYS

July 2, 1957  W. G. ROWELL  2,798,214
CHECKING TECHNIQUE AND SYSTEM
Filed April 23, 1954  13 Sheets-Sheet 12
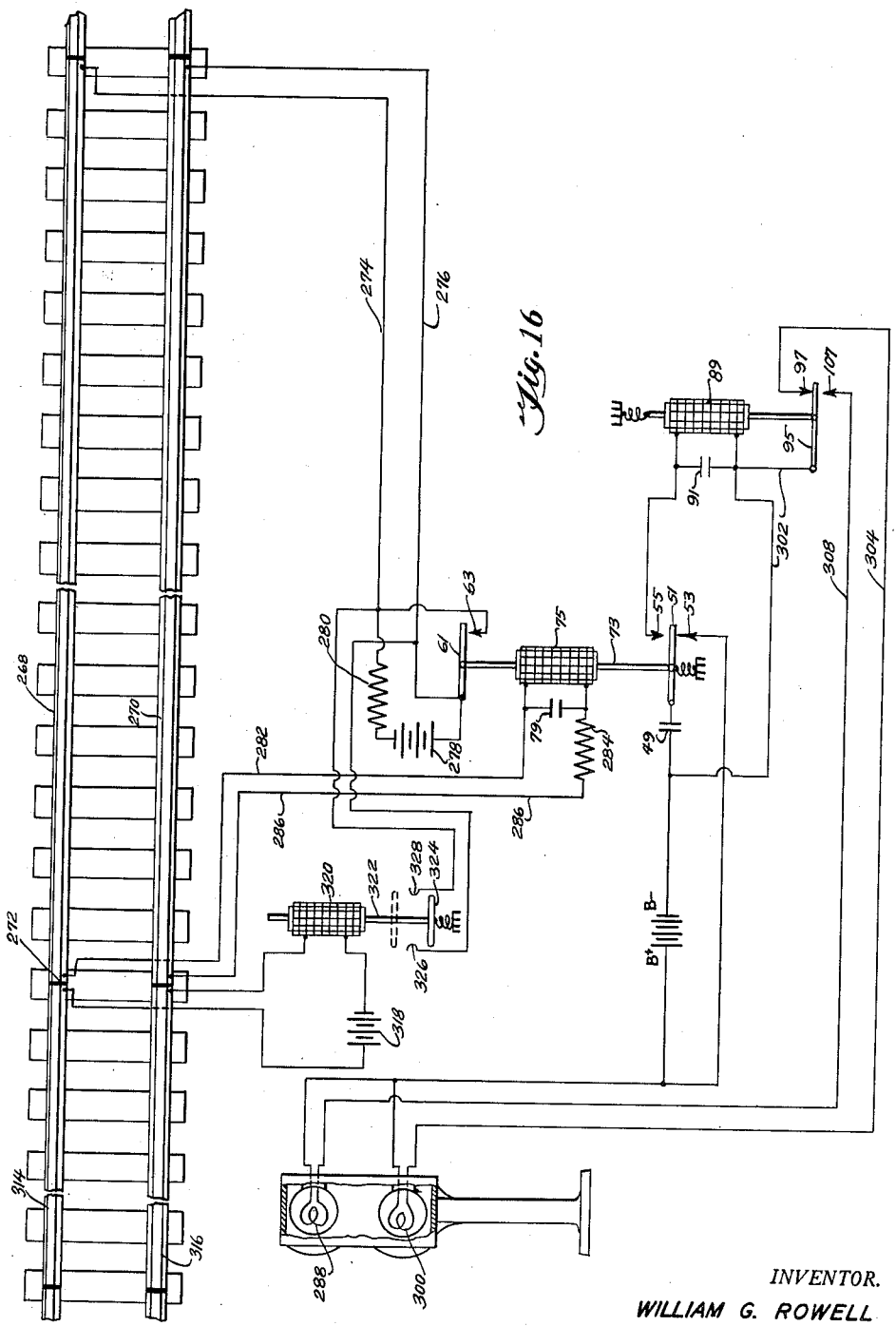
INVENTOR.
WILLIAM G. ROWELL
BY
Rines and Rines
ATTORNEYS

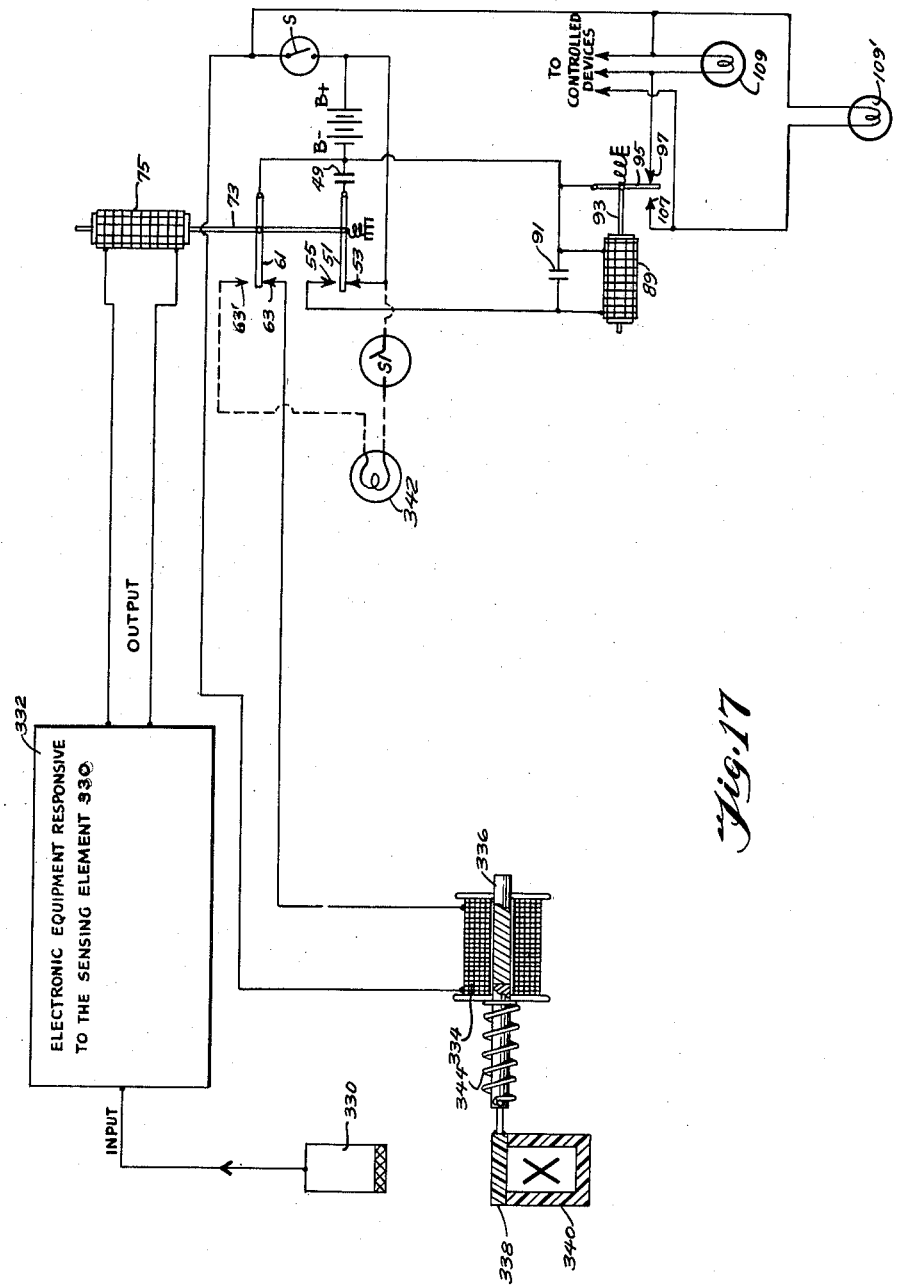

United States Patent Office 2,798,214
Patented July 2, 1957

2,798,214

CHECKING TECHNIQUE AND SYSTEM

William G. Rowell, Quincy, Mass., assignor to Scully Signal Company, Melrose, Mass., a corporation of Massachusetts Application April 23, 1954, Serial No. 425,296

31 Claims. (Cl. 340—213)

The present invention relates to systems and techniques for continually checking the operability of various types of apparatus.

In co-pending application, Serial No. 375,224, of William G. Rowell, filed August 19, 1953, for Checking Technique and System, there are disclosed methods of and systems for continually checking the proper operation of a signal-transmission system through which a signal passes. The pressing need for, and the long sought-after goal of, such a fool-proof automatic check in electrical and electronic circuits and in a wide variety of mechanical and electromechanical systems are therein explained. Equally important, however, is the continual checking of a system that utilizes a detecting mechanism or limit device that is to be set into operation upon the occurrence of a particular predetermined event, and that does not, therefore, pass a signal until the happening of the event. In some systems of such character, of course, a test signal may be periodically introduced to check the proper operation of the system in the manner disclosed in the said copending application. There are numerous systems, however, where it is inconvenient, prohibitively expensive and complex or even impossible to utilize test signals. In many such systems, moreover, it is essential continually to insure that the detecting mechanism or limit device itself is capable of responding in the intended manner upon the occurrence of the predetermined event which is to set it into operation. It is with the problem of checking the operability of such systems that the present invention, therefore, is primarily concerned.

An object of the present invention is to provide a new and improved technique of and apparatus for continually checking the operability of a system provided with a detecting or condition-sensing mechanism or limit device that is to be set into operation upon the occurrence of a predetermined event, and to do so with entire reliability and simplicity, and in a way that is completely fool-proof, automatic, inclusive of all the components of the system including the detecting or sensing mechanism or limit device itself, and is universally adaptable to all types of systems of this character.

An additional object is to provide a novel system for checking that is useful in any electrical, electronic, mechanical or electromechanical system employing a detecting mechanism or limit device and the like.

A further object is to provide a new and improved checking system that is of particular utility with electrical and electronic control systems.

Still another object is to provide a new and improved automatically checked fluid-level control system.

Additional objects are to provide new and improved automatically checked volume, area, pressure, temperature and radiation control systems.

Another object is to provide a new and improved railway checking system.

Other and further objects will be explained hereinafter and will be more particularly pointed out in the appended claims.

The invention will now be described in connection with the accompanying drawings, Fig. 1 of which is a combined fragmentary perspective and schematic circuit diagram of apparatus and circuits constructed in accordance with a preferred embodiment of the present invention;

Fig. 1A is a section, upon an enlarged scale, taken along the line 1A—1A of Fig. 1, looking in the direction of the arrows;

Figs. 2, 3, and 4 are similar views of modifications of the apparatus and circuits of Fig. 1;

Figs. 5 to 8 and 10 are similar views of modifications particularly adapted for the detection of liquid level, area or volume by various different types of detecting or limit mechanisms;

Fig. 9 is a similar view of a modification particularly adapted for pressure detection;

Figs. 11 to 13 are similar views of still further modifications relating to temperature detection;

Fig. 14 is a schematic circuit diagram of a system embodying the present invention as used for the detection of electromagnetic radiation, such as heat or light waves;

Figs. 15 and 16 are similar views of modifications adapted for checking the operability of railroad signalling systems; and Fig. 17 is a similar diagram of an adaptation of the invention to a radio-activity radiation detecting system.

Since, as before stated, the invention may be used with any type of electrical, electronic, mechanical or electromechanical system of the character described, and, as later demonstrated, the technique underlying the invention is entirely independent of the type of apparatus used, it is to be understood that while a particular circuit or other detail may hereinafter be discussed and illustrated in connection with one particular figure only, this is for purposes of illustration, it being understood that all such circuits and details may equally well be directly incorporated into all of the other figures, as well.

Figure 1:
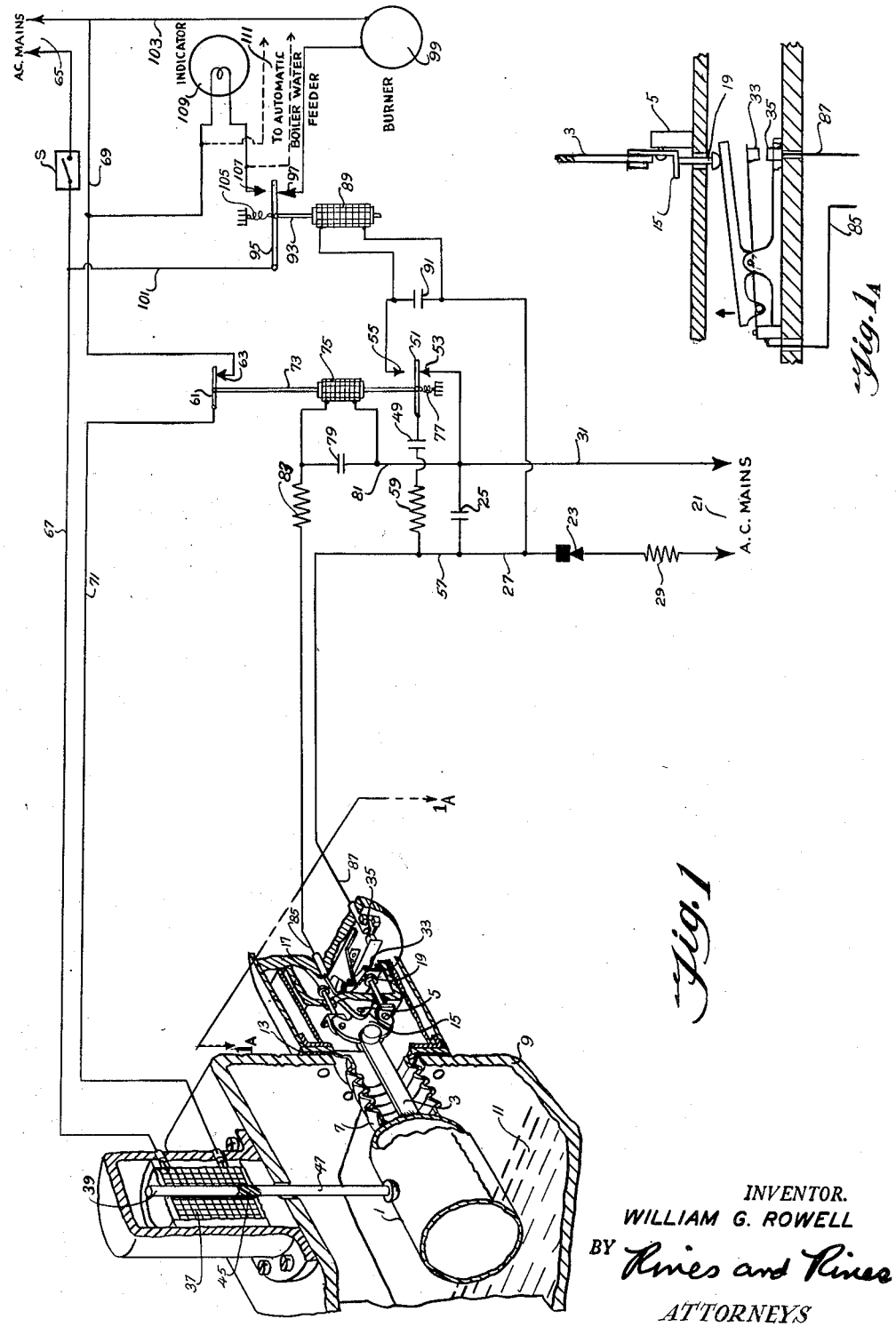

Referring to Fig. 1, the invention is first illustrated as applied to a fluid-level detector. An important application of fluid-level controls is in heater or burner systems where the reaching of a low-water level condition in the boiler should actuate a mechanism to cut off the fuel supply to the heater or burner, or to feed in additional water to the boiler. Present-day low-water fuel cut-off systems employ a float chamber 9 into which water is fed to indicate, by the level of the water in the float chamber 9, the water level in the water boiler of the burner system 99. Within the float chamber 9, a sealed tubular float 1 is disposed, pivoted by an arm 3 about a fixed pivot 5 within a Sylphon bellows 7 that is secured to a wall of the chamber 9 by a collar 13. The flexible nature of the bellows 7 permits free upward and downward movement of the float 1, about the pivot 5, in response to the changing level of the water 11 in the float chamber 9. As the arm 3 pivots upward or downward in response to the movement of the float 1, it moves with it a rocker plate 15 that connects it to the fixed pivot 5. The rocker plate 15 carries at its upper and lower ends plungers 17 and 19 that may operate upon pivoted limit switches, such as 33, that may move into or out of engagement with associated contacts, such as 35. In prior-art devices, the actuation of the switches, such as 33, in response to movement of the float 1, may operate an electric circuit to cut-off the feed of the water to the boiler when the water level has reached a predetermined upper limit, or may effect the feeding of water to the boiler or the cutting off of fuel from the burner when the water level has reached a predetermined lower limit. Should the float 1 become stuck or otherwise inoperative, or should the switch and contact members 33, 35 become pitted or otherwise faulty, or should a failure occur in the electrical circuits connected with the switch and contact members, however, the intended results cannot be achieved. A great hazard thus exists in present-day low-water cut-off systems as a consequence of all of these unsafe conditions.

In accordance with the present invention, on the other hand, no unsafe condition can exist without immediate and automatic detection. This result is achieved by continually periodically simulating the reaching of the predetermined limits to which the fluid level detector or sensor float 1 and the limit switches, such as 33, are to respond, and utilizing the periodic simulation continually to check the electrical and mechanical performance of the complete system. While the invention is applicable to the reaching of either a high-level limit or a low-level limit, or both, or to the reaching of any intermediate level, it will be described hereinafter for purposes of illustration as applied to the vitally important low-level limit. In Fig. 1, this simulation of the reaching of the predetermined low-water cut-off limit is effected by the energization of a solenoid winding 37. Such energization drives an armature 39 downward, driving downward a plunger 47 that is insulatingly connected at 45 to the armature 39. The plunger 47, accordingly, is adjusted to depress the float 1 downward to the same level that the float 1 woud assume if the actual water level dropped to the predetermined low-water limit in the chamber 9, thus effecting a simulated condition of the reaching of the low-water limit. The switch-operating plunger 19 is thus forced to the right, in Fig. 1, causing the switch 33 to engage the contact 35 for a purpose later described.

The control circuit of Fig. 1 is energized from an alternating-current mains inlet 21, through a rectifier 23. Any other source of energy may, of course, similarly be employed. An energy-storage condenser 25 becomes thus normally charged in the circuit traceable from its left-hand terminal by a conductor 27 to and through the rectifier 23, a charging impedance 29 and the mains 21. The circuit continues by way of a conductor 31 back to the right-hand terminal of the condenser 25. The condenser 25 supplies energy to a further condenser 49 at a time when a pivoted switch 51 engages a contact 53, as illustrated. The condenser 49 becomes thus charged to an energized state from the storage condenser 25 in the charging circuit traceable from the left-hand terminal of the condenser 25 to a conductor 57, through a charging resistor 59 and the condenser 49, through the switch 51 and the contact 53 back to the right-hand terminal of the condenser 25.

When the switch 51 is in the illustrated position, an additional pivoted switch 61 simultaneously engages a contact 63. Alternating-current energy from another mains inlet 65 is applied through a line switch S in a conductor 67 and through conductors 69 and 71, interconnected by the switch 61 and the contact 63, to the before-mentioned solenoid 37 to energize the same, thereby to actuate the float 1 to the simulated low-water limit level. The pivoted switches 51 and 61 are carried by an armature 73 of a further relay or solenoid winding 75, the armature being normally maintained in the illustrated position by a return spring 77. Other types of relays or switching mechanisms may also, of course, be utilized. When, as previously explained, the energization of the solenoid 37 produces a simulated low-water cut-off condition and causes the lowering of the float 1 to its lower limit, closing switch 33 against contact 35, still a further condenser 79 becomes charged in the circuit traceable from the right-hand terminal of the energy-storage condenser 25 to a conductor 81, through the condenser 79, a further charging resistor 83 and a conductor 85 to the switch 33 and the contact 35, and thence back along a conductor 87 and conductor 57 to the left-hand terminal of condenser 25. Since this newly energized condenser 79 is connected across the relay winding 75, however, this relay winding also becomes energized. Such energization causes upward movement of the armature 73, opening the switch 61 from the contact 63 and thereby de-energizing the solenoid winding 37. The float 1 thereupon moves upward, in response to the buoyancy of the water, to the actual level of the water 11 in the float chamber 9, returning the plunger 47 upward. The switch 51, however, is also moved upward by the upward movement of the armature 73 and engages the upper contact 55, feeding energy from the charged condenser 49 to a further load-control relay winding 89. This winding 89 is preferably a relatively slowly responding relay that is held energized by a shunt capacitor 91 a particular predetermined interval of time, as later explained. The armature 93 of the winding 89 holds a pivoted switch 95 in engagement with a contact 97 to permit the burner 99 to be energized from the mains terminals 65 in a circuit traceable from the right-hand terminal of the mains 65 by conductor 103 to and through the burner 99 to the contact 97, and thence by the switch 95 and conductor 101 through the switch S to the left-hand terminal of the mains 65. So long as the relay winding 89 is energized, therefore, the burner 99 may operate.

The return of the float 1 from the simulated low-water position, however, opens switch 33 from the contact 35, de-energizing the relay winding 75. The spring 77 then returns the armature 73 to the illustrated position, closing switch 61 into engagement with contact 63 and re-energizing the solenoid 37 to repeat the simulated low-water condition, and, also, to re-energize the condenser 49, as before explained. The switches 51 and 61 of the relay 75 are thus periodically pivoted back and forth as the float 1 is periodically repetitively moved to a simulated low-water limit and then permitted to return to the actual water level. The pulsating signal produced by this periodic operation serves as a repetitive checking signal of period substantially equal to or less than the predetermined de-energization time of the relay winding 89, say, from once every three or four seconds to once every thirty or sixty seconds, more or less. The load-control relay winding 89 will remain energized throughout this cyclical operation, maintaining the burner 99 energized.

Any possible component failure in the water-level detecting float 1, in the limit switch 33, in the solenoid 37, or in any part of the control circuit through the ultimate load-control relay 89, will result in de-energization of the relay 89 at a time after the occurrence of the failure equal to the before-mentioned predetermined time interval. Such de-energization of the relay 89 results in the switch 95 pivoting upward under the action of the restoring spring 105 into engagement with the contact 107, connecting the conductor 101 through the switch 95 and the contact 107 to an indicator lamp 109 or other alarm device which then becomes energized from the mains 65. Other types of visual, audio, alarm or other indicators may be similarly controlled, or control voltages or currents indicative of improper operation of the system may be fed from the dotted conductors 111, as is well known. These same remarks apply, also, in connection with the other embodiments of the invention. The term "indicate," indeed, as used in the specification and the claims, and as more fully explained hereinafter, is intended to embrace not only such visual or audio indications, but, also indications that are evident through the fact that there is effected the operation or shut-down of a device, such as a control apparatus. In Fig. 1, indeed, the rendering effective of the indicator 109, simultaneously cuts off or renders ineffective the burner 99, as a result of the broken connection between the switch 95 and the contact 97.

In accordance with the present invention, therefore, the reaching of a predetermined low-water level condition will shut off the burner 99, or effect any other desired operation such as the operation of the alarm 109, or the operation of the control circuit 111 to operate controlled devices to feed more water into the boiler. Through the process of continually repetitively simulating the low-water condition, moreover, the water-level detecting float 1 and the limit switch 33 are continually checked for operability. This periodic simulation, in turn, controls a corresponding periodic energization and de-energization of the electric control circuit. If the solenoid 37, which initiates the simulated signal for operating the float 1 to the low-water level, be considered the input of the system, and the load relay 89 be considered the output of the system, there exists a control of the input in response to the recovery of a switched, pulsed or chopped checking signal in the output corresponding to the periodic simulated operation of the float 1. This may be viewed as a feed-back type of control from the output to the input, as discussed in the said copending application, and it inherently continually circuit-checks the proper operation of all of the components of the system. One is always sure, therefore, that when the unsafe low-water condition actually occurs, the detecting mechanism and the complete control circuit are in thoroughly operative condition to respond to the same.

It is not necessary, of course, that the specific circuit arrangement of Fig. 1 be utilized to practice the invention. A large number of variations, substitutions and modifications will immediately suggest themselves to those skilled in the art. Instead of employing the load-control relay 89, for example, the energy of the condenser 49 may be fed to a coil 89', Fig. 2, that may serve as the primary winding of an output transformer 110. A cooperative secondary winding 113 may energize an indicator lamp 109, this time to indicate proper operation of the system, and the burner 99 may be energized from a further cooperative secondary winding 115. In such a system, it would be preferable to oscillate the float 1 upward and downward at a frequency sufficiently high to effect energization of the secondary windings 113 and 115 of the transformer 110. Where high transformer current is desired, the condenser 49 may be replaced by a battery or other source, not shown.

Figure 2:
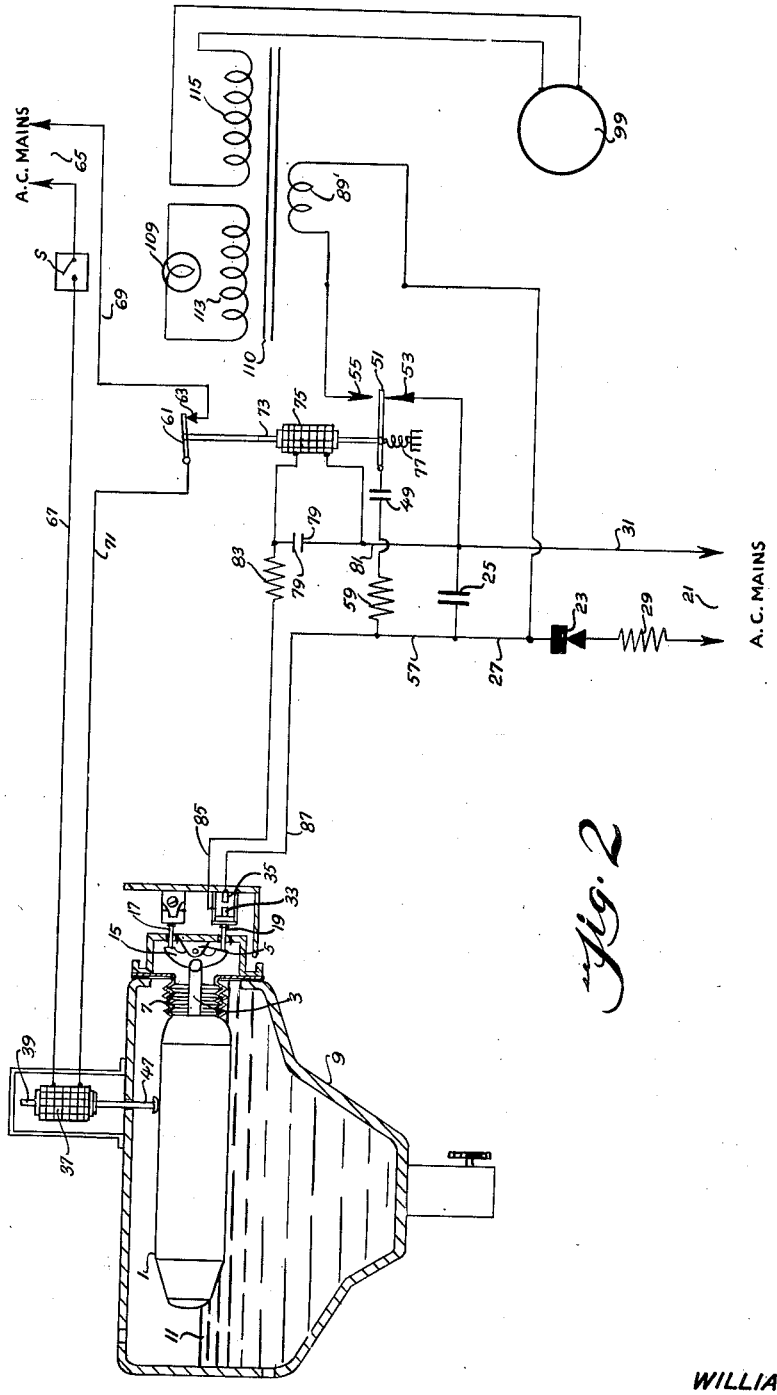

It is also possible, as another illustration, to utilize but a single relay 75 to actuate the load of the control circuit, such as the indicator 109, by incorporating the switching function of the switch 51 of Figs. 1 and 2 into the switches associated with the float chamber 9. In Fig. 3, therefore, the condenser 49 is connected by conductor 87 to a switch 117 that may be actuated by the plunger 19 between a contact 119 and a contact 121. The contact 119 may be connected by a conductor 123 to the negative or B— terminal of a direct-current source, which may be the combined alternating-current mains 21, the rectifier 23 and the energy-storage capacitor 25 of Figs. 1 and 2. The contact 121 is connected by the conductor 85 to the condenser 79. The condenser 49, therefore, charges from the source B+, B— when the switch 117 is in engagement with the contact 119, and discharges into or energizes the load relay 75 when the switch 117 engages the contact 121. The plunger 17, when the float 1 is in its uppermost position, may similarly maintain a switch 125 in engagement with a contact 127 to connect the mains 65 through conductors 69, 71 and 67 to the solenoid winding 37. The timing of the periodic operation of the system may again be achieved by regulating the solenoid 37, the restoring movement of the float 1, or by any other desired controls.

As still another example, in Fig. 4, the operation of the solenoid 37 is not controlled by the feed-back switching or pulsing action of the control circuit. In Figs. 1 to 3, the energization of the solenoid 37 was effected synchronously with the charge-and-discharge switching of the control circuit, with a feed-back type of control from the output to the input of the control circuit. In the embodiment of Fig. 4, on the other hand, there is no input-to-output feed-back or other control. A separate independent timer 129 of any desired type, such as a vibrator power supply for feeding periodic signals to the solenoid 37, is there utilized. The plungers 17 and 19 actuate a switch 131 between contacts 133 and 135 for alternately charging the condenser 49 and discharging the same into the load relay 75. Again, however, even though external timing is used, the system is completely fail-safe. The time constant of the condenser charging circuit is equal to or less than the period between successive energizations of the solenoid 37 by the timer 129, and the de-energization time of the relay 75 is at least substantially equal to this period. The solenoid 37, of course, could be replaced by a pneumatic, hydraulic or other periodically operated device to effect operation of the plunger 47. This same substitution could, of course, be made, also, in the other embodiments of the invention.

While, as before stated, the techniques illustrated in Figs. 1 to 4 could equally well be applied to a high-level liquid cut-off limit or to both low- and high-level limits, for illustrative purposes, a somewhat modified arrangement adapted for operation with both upper and lower limits is shown in Fig. 5, employing a different type of level detector. In place of the float-type level sensor or detector 1 of Figs. 1 to 4, a vertically oscillating probe-electrode sensor or detector 137 is employed. The oscillating motion, in the direction of the arrows, may be imparted to the electrode 137 in any desired way, as by the action of a cam 139 rotated by a clock-type synchronous motor or similar device 141 and bearing upon a resilient suspension 143 for the electrode 137. So long as the electrode 137 periodically makes and breaks contact with the water 11 in the chamber 9, as it oscillates up and down, it will become periodically grounded through the water 11, the walls of the chamber 9 and the walls of the boiler 145, which are shown connected to a ground terminal 147. When the electrode level detector 137 is thus grounded, the relay 75 becomes energized from the source B+, B— in the circuit traceable from the ground 147 to the grounded terminal 151 of the B— terminal of the source, through the source B+, B— and the relay winding 75, and back to the electrode 137 by way of a flexible conductor 153. This energization of the winding 75 causes the armature 73 to move downward, effecting engagement between the switch 51 and the contact 53 and between the switch 61 and the contact 63. A condenser 149, corresponding to the condenser 49 of Figs. 1 to 4, may then become charged from the source B+, B— since the left-hand terminal of the condenser is connected by conductor 155 through the source B+, B— to the ground terminal 151, and the engagement of the switch 51 with the contact 53 grounds the right-hand terminal of the condenser 149 at 157, completing the charging circuit thereof.

Upon the upward movement of the electrode 137 out of contact with the water 11, however, the relay 75 becomes de-energized, returning the switches 51 and 61 to their illustrated positions. The switch 51 now contacts the contact 55, so that the energy from the condenser 149 becomes discharged into the preferably slow-release load-control relay 89. So long as the oscillatory movement of the electrode 137 continues, the relay 75 will continue to be pulsed and the relay 89 will remain energized. If, however, the level of the water 11 should fall below the predetermined low-level limit, the electrode 137 would not contact the water at all, and the relay 75 would remain un-energized in its illustrated position, correspondingly de-energizing the load-control relay 89. The switches 95 and 95' of the relay 89 will then be moved upward in response to the restoring action of the spring 105, engaging, respectively, the contacts 107 and 107'. Since switch 61 engages the contact 63' at this time, as shown, the indicator lamp 109 will become illuminated. This is because the B+ terminal of the source is then connected by conductor 155 through the switch 61 and the contact 63' and through the switch 95' and the contact 107' to the filament of the lamp 109, the other side of the filament of the lamp being connected to the B— terminal through the ground connection 159. The lamp 109 will thus indicate the reaching of the low-water limit.

If, on the other hand, the water in the boiler 145 rises too high, say above the limit established by the upper inlet 161 into the chamber 9, the electrode 137 during its upward movement will not draw out of the water 11, so that the relay 75 will remain energized, again de-energizing the load-control relay 89 since the condenser 149 can no longer energize the same. The switch 61 will now engage the contact 63, energizing the indicator lamp 163 from the source B+, B—, through the closed switch and contact 95—107. The lamp 163 will therefore indicate the reaching of the upper fluid-level limit. As in the case of the preceding embodiments of the invention, the indicator lamps 109 and 163 may be replaced by other alarm devices or control circuits the operation of which indicates the reaching of the predetermined limits. The detector or limit-switch electrode 137 and all of the control circuits are again completely continually circuit-checked through the continual simulation of conditions of high and low level effected by the periodic make-and-break oscillation of the electrode 137.

Not only do the embodiments of Figs. 1 to 5 deal with detecting fluid level, but, since the configuration of the fluid chamber is known, volume and area limits are also thereby monitored. All of these embodiments, moreover, utilize moving detectors or limit devices within the fluid itself, such as the float 1 of Figs. 1 to 4 and the moving probe electrode 137 of Fig. 5. This is, however, by no means necessary. In Fig. 6, for example, capacitance measurements are employed without physical contact with the fluid 11 in the chamber 9. The chamber 9 in this case may, indeed, be a conventional fluid level sight glass external to the boiler 145. The level-simulating detector is in the form of a conductive ring or clip 165 disposed outside and in close proximity to the sight-glass chamber 9 and providing capacitance to the grounded fluid 11 within the chamber 9. The ring 165 may be oscillated up and down by a solenoid 37, corresponding to the solenoid 37 of Fig. 1, to simulate reaching, for example, the low-level water limit where the capacitive impedance presented between the ring 165 and the water will have a predetermined value. This periodic impedance variation, simulating the reaching of a predetermined fluid level limit, is caused to react upon a vacuum-tube or electron-tube oscillator which, in turn, is circuit-checked in precisely the fashion described in connection with the embodiment of Fig. 1. Similar parts in Figs. 1 and 6 have therefore been given the same numerals and a detailed description of the circuit-checking operation need not be repeated.

While the vacuum-tube oscillator may assume any desired form, and, indeed, may be replaced by other types of electric-oscillating systems, for purposes of illustration, it is here shown comprising a pair of pentodes 2 and 4 each having respective plates 6 and 8, cathodes 10 and 12, heaters $H_1$ and $H_2$, control-grid electrodes 14 and 16, screen-grid electrodes 18 and 20, and suppressor electrodes 22 and 24, respectively strapped to the cathodes 10 and 12. Between the control electrode 14 of the tube 2 and a ground terminal 26 of the heater $H_1$ thereof, the oscillator inductance $L_1$, $L_2$ is connected, with its intermediate tap 28 connected to the cathode 10. The tuning condenser 32 is connected in parallel with the inductance $L_1$, $L_2$. This circuit will be recognized as of the Hartley type. A series capacitance $C_1$ is inserted between the upper terminal of the inductance $L_1$ and the control electrode 14, the inductance $L_1$ being shunted by a grid-leak resistor 30. This capacitance $C_1$ and the capacitance provided between the movable ring 165 and ground, through the fluid, control the amplitude or intensity of the electric oscillations produced in this circuit. The plate 6 of the tube 2 is connected by conductor 67 from the upper mains terminal 65 to the cathode 12 of the tube 4. The screen grid 18 of the tube 2 is connected through a choke 32' to the plate 6, and by a decoupling condenser 34 to the cathode 10. The screen grid 18 is also connected through an RC network 36 to the control grid 16 of the output tube 4. The screen grid 20 of the tube 4 is, in turn, connected to a variable tap on a bias potentiometer 38 that interconnects the heaters $H_1$ and $H_2$ between the upper and lower terminals of the mains 65.

The operation of this oscillator may be explained somewhat as follows. Since the cathode 10 is at some radio-frequency potential during oscillation and the control grid 16 is by-passed for high frequencies by the condenser 34 to the cathode 10, a negative direct-current voltage related to the peak radio-frequency potential on the cathode 10 will be developed at the control grid 16. The tube 2 oscillates on the positive half of the alternating-current cycle from the mains 65, building up this negative bias voltage on the control grid 16 of the output tube 4. During this time, the mains voltage is applying a positive voltage to the cathode 12 of the tube 4, so that the tube 4 is non-conductive. On the negative cycle of the mains voltage, the tube 2 ceases to conduct because of the negative potential applied to its plate 6 from the mains 65, but the output tube 4 tends to conduct since its cathode 12 has now become negative, and such conduction occurs under the control of the negative bias voltage maintained on the control grid 16 by the condenser of the RC network 36. The greater the intensity of the oscillations in the tube 2, the greater the bias upon the control-grid 16. The plate 8 of the tube 4 is returned to the lower terminal of the mains 65 through the relay winding 75, corresponding to the relay 75 of Fig. 1, so that the complete oscillator circuit must be operative to permit energization of the relay 75.

When the switch S is closed to energize the system, the condenser 49 is charged in the usual checking-circuit manner, before described in connection with Fig. 1. Minimum oscillations occur in the oscillator tube 2, however, because the ring 165 is in close relationship to the liquid 11. These oscillations of small intensity, in turn, cause the output tube 4 to conduct because, as explained above, the value of negative bias on the grid 16 of the output tube 4 will then be small, also. The output tube 4, in conducting, energizes the relay 75 which closes the switch 51 into engagement with the contact 53, thereby energizing the load-control relay 89, as explained in connection with Fig. 1. The load relay 89 then opens or closes the circuit to the controlled devices, not shown, as desired. When the relay 75 operates, it also closes the switch 61 to energize the solenoid 37 which, in turn, pulls its armature 39 into the solenoid coil and lifts the ring 165 upward. The capacity of the ring 165 to ground decreases as it moves further away from the grounded fluid 11. This increases the intensity of the oscillations in the tube 2 and thus produces a larger negative bias on the control grid 16 of the tube 4 to stop the output tube 4 from conducting. The relay 75 will now release, de-energizing the solenoid 37. The frequency of this cycling action may be varied by many means, such as by changing the values of the grid leak resistance and condenser 36, the time constant of the relay 75 and its holding condenser 79, and so on. It is to be understood that the time constant of the relay 89 is so chosen that the relay 89 will not release during the periods that the relay 75 is pulsating, as before explained in connection with Fig. 1. The sensitivity of the circuit may also be varied in many ways, as by changing the resistance of the choke coil 32', which reacts to change the intensity of the oscillations, or by changing the values of the parameters in the oscillating circuit itself. The circuit, of course, is adapted to respond to the fluid, whether or not the fluid is grounded or even conductive since the dielectric constant in the capacitance between the ring 165 and ground also controls the impedance value of the capacitance. It may also be adapted to respond to predetermined concentrations of mixtures in the fluid as well as to the fluid level. Other materials besides fluids may also, of course, be employed, as later discussed.

In the system of Fig. 6, therefore, not only the level-sensor or detector capacitor element 165, that is moved periodically to simulate, for example, the reaching of the low-fluid limit, but the complete oscillator and output circuit and the complete control circuit itself are continually checked for proper operability. Other types of impedance variation besides capacity changes may also be employed in accordance with the checking principles of the present invention. The system of Fig. 7, for example, is precisely the same as that of Fig. 6 except that the capacitive ring 165 of Fig. 6 has been replaced by a coil 167 having three terminals A, B and C. The coil 167 substitutes, also, for the oscillator inductance $L_1$, $L_2$, the portion between the terminals A and B corresponding to $L_1$, and the portion between the terminals B and C, to $L_2$. The simulated limit condition, effected by movement of the coil 167 under the control of the solenoid 37, now effects inductive impedance changes that cause operation in the same manner as discussed in connection with the embodiment of Fig. 6.

There are some applications of fluid-level detection where it is desirable to check the operability of the system without movement of the detecting element above or below predetermined limits within the fluid. In Fig. 8, therefore, a probe electrode 169 is periodically inserted laterally into the fluid 11 at any desired position, and can operate in the intended manner irrespective of the height of the fluid thereabove. A solenoid winding 171 corresponding to the solenoid 37 of Fig. 1, is energized by conductors 172 upon closure of the power-supply control switch S and engagement of the switch 61 of the relay solenoid 75 with the contact 63. The armature 173 moves to the left in opposition to the biasing action of the spring 175. The probe electrode 169 is sandwiched between insulators 177 and 179, the latter of which secures the probe mechanically to the armature 173. When the armature 173 moves to the left, the insulating member 177 and the probe 169 assume the dotted positions 177' and 169', spaced from the walls of an insulating tube 181 that protrudes into the fluid 11 to protect against foreign particles lodging between the probe 169' and the portions 182 of the conductive walls of the housing 183 within the fluid 11. If the fluid 11 is conductive, it will then establish electrical connection from the said portions 182 of the conductive walls of the housing 183 within the fluid 11 to the probe 169'. The probe 169, however, is internally connected by conductors 185 and 187 to one terminal of the relay 75, and the other terminal of the relay 75 is connected by conductor 189 to the B+ terminal of the power source B+, B—. The B— terminal, in turn, is connected by a conductor 191 to the housing 183. A complete circuit thus is effected to energize the relay 75 from the source B+, B— through the probe 169, the fluid 11 and the housing 183. The pulsing relay 75 then operates to open the switch 63' and de-energize the solenoid 171, retracting the probe 169 and thereupon de-energizing the relay 75, all as described in connection with the system of Fig. 1. Again, as in the case of the other apparatus before discussed, the probe 169 itself and the complete control circuit are continually checked for proper operation as a result of the pulsating operation of the probe 169. The system of Fig. 8, moreover, utilizes the type of feed-back or output-to-input control discussed in connection with Fig. 1, but, as in the case of any of the other figures, before and hereinafter discussed, independent operation of the solenoid 171 from an external timing device, such as is utilized in Fig. 4, may, if desired, be employed.

Thus far, fluid-level, area or volume detecting devices have been described in connection with float, probe and inpedance-measuring or -sensing detectors. As still another illustration, in Fig. 9, the level, area or volume of a fluent material 11, which may be in solid or gaseous form, as well as in liquid form, is detected and controlled by pressure. The chamber 9 may be of the character before described, or, as another example, it may be a storage bin for solid material 11. The material 11, when of at least a predetermined height in the chamber 9, will exert sufficient pressure upon a flexible diaphragm 191 to drive a plunger 193, integral with an armature 195 of a solenoid winding 197, into engagement with a resilient arm 199. At the free end of the arm 199, a contact 201 is provided that is thus moved out of engagement with a cooperative contact 203. Upon closure of the switch S from the mains 65, the winding 197 is energized through conductors 205, as in the system of Fig. 1, driving the armature 195 to the left and causing the plunger 193 to push against the diaphragm 191 to the left. This operation simulates the reduced-pressure condition upon the diaphragm 191 that would be caused by a reduction in level, volume or area of the material 11 below a desired limit. The resilient arm 199 thereupon causes the contact 201 to engage the contact 203, energizing the relay 75 from the source B+, B—, along conductors 207, 209 and 211 in a manner similar to that previously described in connection with the other embodiments of the invention. The operation of the relay 75 causes the switch 51 to engage the contact 55, energizing the slow-release load-control relay 89, as before described. This operation also opens the switch 61 from the contact 63, de-energizing the solenoid 197 and permitting the pressure of the material 11 upon the diaphragm 191 to return the armature 195 to its illustrated position where it opens the contacts 201 and 203 and de-energizes the relay 75. Once more, the pressure-detecting or -sensing element and the complete control circuit are continually checked for proper operability and, as in the case of the float-actuated devices of Figs. 1 to 4, the action or lack of action of the fluent material effects a response in the detection circuit that, in turn, gives rise to a simulated operation of the sensing or detecting element to produce a periodic checking signal.

Figure 10:
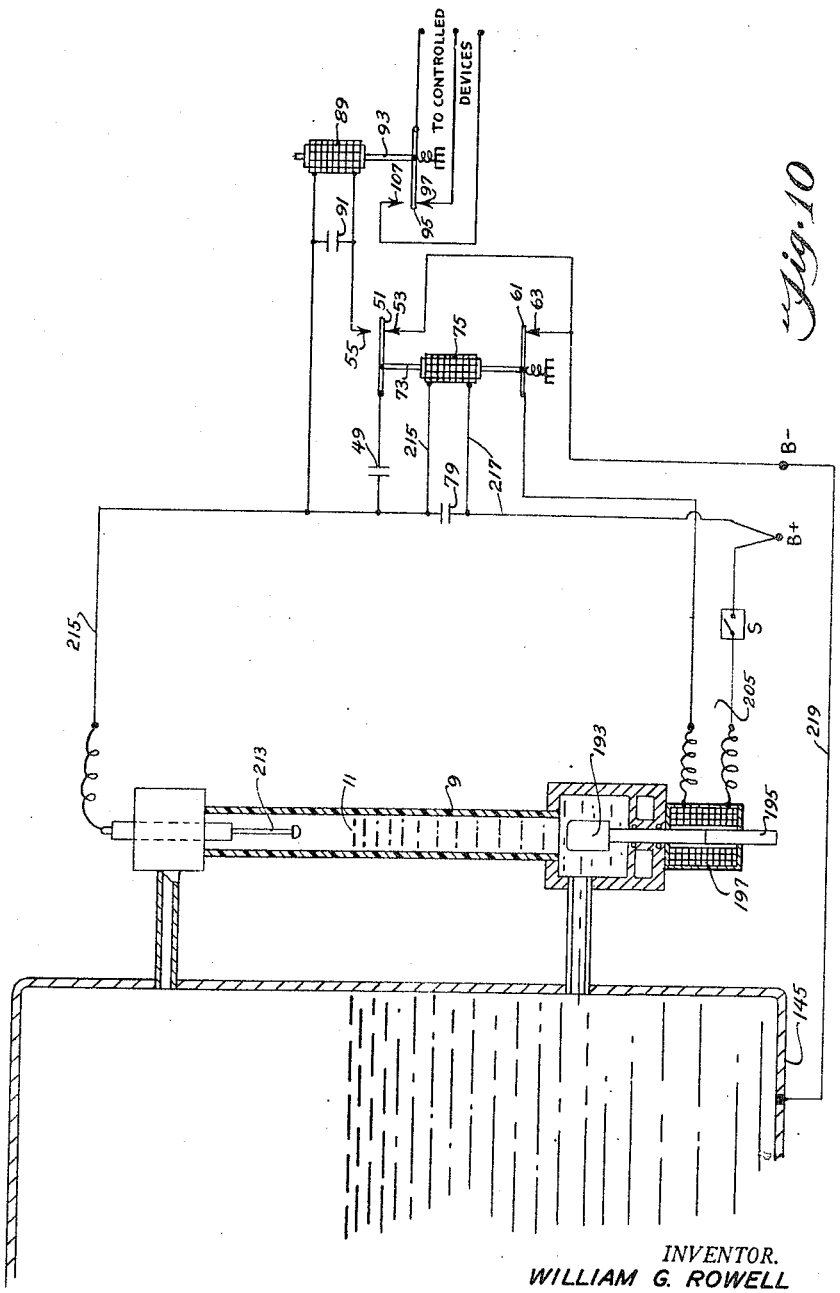

The pressure-sensing element may, indeed, be employed, also, to generate movement of the fluid itself in order to simulate low- or high-level limits. Thus, in Fig. 10, the plunger or piston 193, operated by the action of the armature 195 of the solenoid 197, is disposed directly within a sight-glass chamber 9 similar to that described in connection with the systems of Figs. 5 to 7. The up-and-down movements of the plunger or piston 193 will cause the fluid 11 correspondingly to move up and down, periodically making and breaking contact with a fixed probe 213 in order periodically to energize the pulsating relay 75 in the circuit traceable from the probe 213 by conductor 215 to the upper terminal of the winding 75, through the winding 75 to the lower terminal thereof, and by conductor 217 to the B+ terminal of the source B+, B—. The energizing circuit for the relay 75 continues through the source B+, B—, by conductor 219 to the walls of the tank 145, and through the fluid 11 to the probe 213 at times when the fluid is moved upward in the chamber 9 to contact the probe 213 in response to the pressure action of the piston 193. In other respects, the circuit of Fig. 10 operates in the same manner as that of Fig. 9, but with a single power source B+, B— used for both energization of the energy-storage condenser 49 and the momentary energization of the solenoid relay winding 197. Other well-known pulsating devices besides the piston 193 may obviously also be employed to impart periodic movement to the fluid level.

The invention has heretofore been restricted to the detection of limits in the level, volume or area of a fluid or other material by float-type detectors or sensing elements, by probes, by impedance variations, by pressure-sensing elements and by artificial periodic movement of the fluid itself. As previously stated, however, the invention is by no means restricted to such applications, but is of broad, general utility. In Figs. 11 to 13, therefore, the invention is illustrated as applied to an entirely different field, namely to sensors or detectors of heat radiation. While any type of temperature-sensing element may be employed, for purposes of illustration, a simple bi-metal strip detector 221 is shown. The detector 221 is pivoted at its right-hand end 223 and is provided at its other end with a contact 225 that may normally engage a cooperative contact 227. The contact 227 is connected through a heater strip 229, disposed adjacent the bi-metal detector 221, to the B— terminal of the source B+, B—. Since the B+ terminal is connected by conductor 231 to the lower terminal of the pulsing relay winding 75 and the bi-metal detector 221, is connected by conductor 233 to the upper terminal of the winding 75, the heater strip 229, the bimetal detector 221, the relay winding 75 and the source B+, B— are all connected in series circuit. The winding 75 becomes thus energized, effecting the movement of the switch 51 into engagement with the contact 55 and the energization of the load-control relay 89 from the condenser 49, as previously described. The energized heater strip 229, however, will simulate a predetermined elevated temperature condition that it is desired to detect, causing the bi-metal detector 221 to warp upwards and break contact between the contract members 225 and 227, simultaneously de-energizing the relay 75. Upon cooling, the bi-metal detector 221 will again drop downward to effect engagement of the contact members 225 and 227 and to repeat the pulsating cycle. The operability of the detector and of the control circuit are thus again fully and continually checked. In this embodiment, as in other figures, the holding condenser 79 of the relay 75 may, if desired, be eliminated.

Other components may also be eliminated if it is desired to simplify the circuits. In Fig. 12, the pulsing relay 75 is replaced by an external timer device 128 which may take the form of a periodically operated switch of any well-known type. The bi-metal detector may be directly connected at 223 by the conductor 233 to the left-hand terminal of the energy-supply condenser 49, the right-hand terminal of which is connected to the B+ terminal of the supply B+, B—. The heater 229 is shown above the bi-metal detector 221 in Fig. 12, with the detector 221 upside down from its position in Fig. 11, so that the contacts 227 and 225 still cooperate. The timer switch 128, when closed, causes the heater strip 229 to become connected between the B— and the B+ terminals of the source B+, B—. The resulting heating of the detector 221 causes its upward movement so that contacts 225 and 227 come into engagement and permit the condenser 49 to charge from the source B+, B—. The timer 128 then open-circuits, causing the heater strip 229 to cool, and the bi-metal detector 221 to return to the position shown. An extra contact 225' upon the underside of the bi-metal detector 221 thereupon engages a further contact member 227'. The closed contacts 225' and 227' permit the charged condenser 49 to energize the load-control relay 89, as heretofore explained. The system of Fig. 12 is to be compared with the externally operated system of Fig. 4, while the system of Fig. 11 is of the output-to-input feed-back type illustrated in, for example, Figs. 1 and 9. Both types of circuits, as above explained, however, continually check the operability of the complete system to respond to the intended stimulus.

Still a further simplification is illustrated in Fig. 13 which utilizes the feed-back principle and obviates the necessity both for the pulsing relay 75 of Fig. 11 and the timer 128 of Fig. 12. At the end of the bi-metal detector 221 a further contact member 220 is carried which may bear against a switch 222, normally urged upward by a return spring 224. The switch 222 is connected by a conductor 226 to the contact 227 and to the B— terminal of the B+, B— supply. When the contact member 220 depresses the switch 222, as shown, the switch engages still a further contact 228 with which one terminal, shown as the left-hand terminal, of the heater element 229 is connected. The right-hand terminal of the heater element 229 is connected to the B+ terminal by conductor 230. The heater element 229 becomes thus heated in the circuit traceable from the B+ terminal along conductor 230 to and through the heater element 229, and through contact 228, switch 222 and conductor 226 back to the B— terminal. When the bi-metal detector 221 warps upward, switch 222 disengages the contact 228, so that the heater element 229 is disconnected from the B— terminal and de-energizes. The rest of the circuit operates in the manner described in connection with the system of Fig. 12.

Other types of radiation sensors or detectors, such as photo-cells and the like, may also be continually automatically monitored in accordance with the circuit-checking features of the present invention. It has previously been proposed, for example, to detect fires with a lead sulfide photo-conductive cell or similar detector. This type of cell responds to both luminous flames and infrared heat radiation, and has heretofore been used with a monitor circuit containing a filter and amplifier for responding only to the particular fluctuations characteristic of a flame. If, however, the cell becomes defective or the many components of the monitor circuit including the filter and the amplifier become inoperative or faulty, these unsafe conditions may lead to serious consequences. By applying the present checking techniques to the system, however, the operability of the cell itself, as well as the complete monitor circuit and the checking circuit, is continually checked. Such a lead-sulfide-cell sensor or detector is shown at 240 in Fig. 14, comprising a lead-sulfide unit, schematically represented as a variable resistor, deposited between aquadag-strip electrodes 242, 244, and contained in a fire-detection unit 248. The detector 240 is shown connected by conductors 246 to the conventional monitor circuit 250, above described, which may be connected to the mains through the power switch S. When the detector 240 receives the characteristic light fluctuations of a fire flame, the filter in the conventional monitor circuit 250, will pass the fluctuation currents developed and produce a bias voltage that may cut off the monitor amplifier, before discussed. The circuit-checking pulsating relay 75 is connected by conductors 252 to the output of the monitor circuit amplifier 250 so that the relay 75 is de-energized upon receipt of the proper light fluctuations by the detector 244. The energy storage condenser 49 is then permitted to charge through the switch 51 and the contact 53 from the power supply B+, B—, schematically illustrated as a battery. Upon cessation of the flame fluctuations, however, the monitor-circuit amplifier 250 may again conduct, energizing the pulsating relay 75 and permitting the condenser 49 to discharge through the switch 51 and the contact 55 through the load-control relay system 89, 81, as previously described in connection with other embodiments of the invention. A pulsating modulator 254, such as a conventional vibrator power supply or an oscillator, of any desired type, becomes energized upon the closing of the switch 61 into engagement with the contact 63. This closure connects conductors 256 and 258 in order, for example, to complete the power-supply circuit of the modulator 254. The modulator 254 thereupon transmits a plurality of impulses along conductor 260 and the grounded conductors 262 and 266 through the filament of a lamp 264 disposed adjacent the detector 240 in the fire-detection unit 248. The lamp 264 will therefore flash periodically in response to the impulses, simulating the flickering light of a flame and thereby operating upon the detector 240 and the monitor circuit 250, as above explained. Adjustments in the amplitude of the simulating impulses and hence in the sensitivity of the detector 240 may be effected by the rheostat R. The frequency of the modulator 254 is adjusted to correspond to the flicker frequency of a flame and to the resonance frequency of the filter in the monitor circuit 250. This frequency may be of the order of ten to fifteen cycles per second, more or less. Promptly upon the resulting de-energization of the pulsating relay 75, as before mentioned, the switch 61 will open from the contact 63, ending the burst of pulsations fed to the lamp 264, so that the circuit-checking cycle will thereupon repeat continually. As in the case of the systems of the other figures, heretofore discussed, the time constants of the relays 75 and 89 are chosen so that the relay 89 will remain operated during the operation of the relay 75 and during the successive bursts of pulsations of the modulator 254. When an actual fire occurs, of course, the relay 75 will remain de-energized so that the load-control relay 89 will thereupon de-energize, operating a suitable alarm or other indicator. Similarly when there is a failure in the detector 240, or in the monitor circuits, the checking circuits or the modulator circuits, the load-control relay 89 will again de-energize, thereby also producing an indication of such failure.

Figure 15:
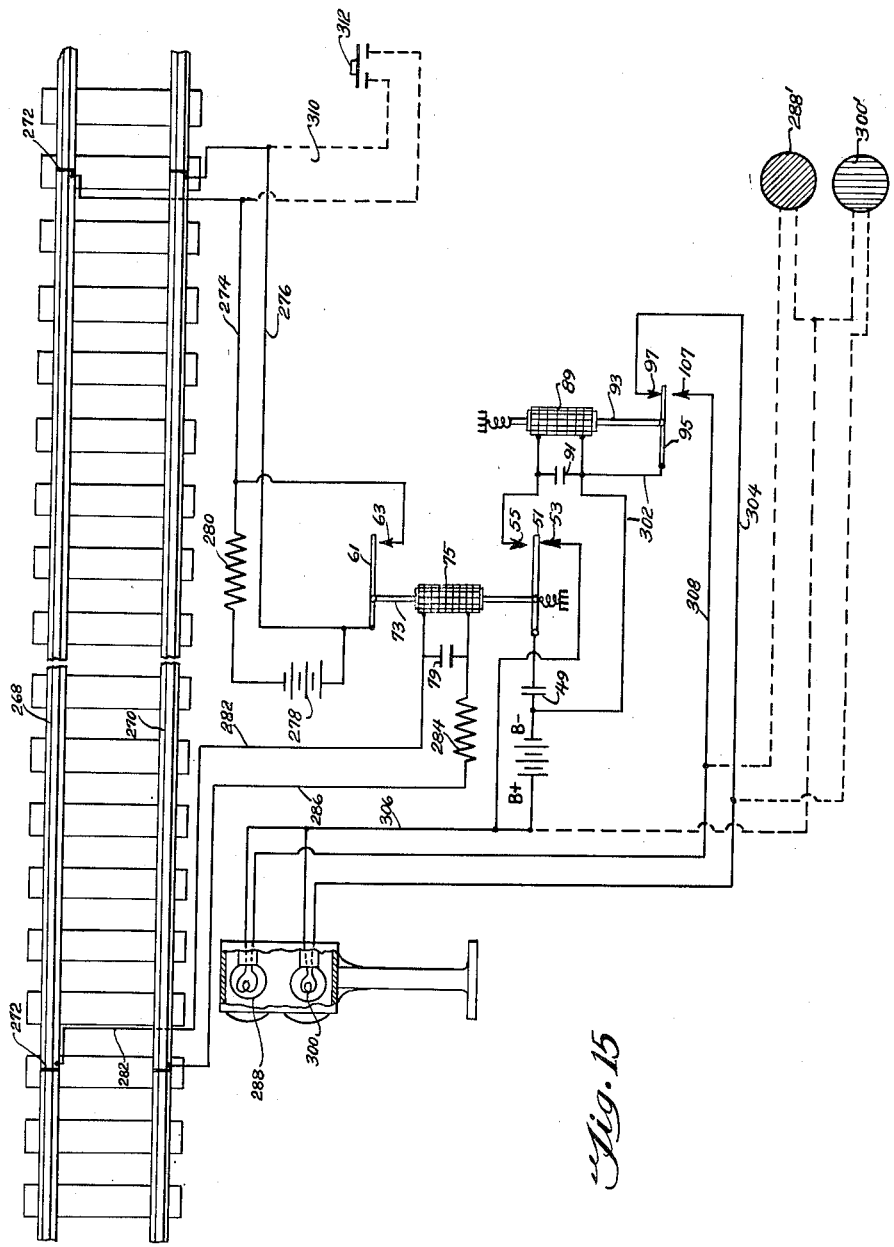

Still another illustration of the wide applicability of the invention is presented by Figs. 15 and 16, directed to the railway-signalling field. Many devices have been heretofore proposed for attempting to insure the proper operation of railway-signal systems. These prior proposals have involved the use of a code transmitter and a decoder for testing the signal system. While such operation will test the system for open-circuits, short-circuits or undesired grounding, it cannot insure that the system will respond to the signal that it is to detect, namely, the passage of a train over a predetermined section of track. In accordance with the technique previously explained, however, the operability of the system to respond to the desired signal and the complete operability of the system itself are continually checked, and without the need for the prior-art code transmitters and decoders.

Referring to Fig. 15, a predetermined section of track of any desired length is shown at 268 and 270, insulated by elements 272 from adjacent track sections, and by the ties, from ground. It is desired to operate signal lights when it is detected that a train passes over the predetermined track section 268 and 270 and short-circuits the rails 268 and 270 through the train wheels and axles. This signal of the train short-circuiting the rails 268, 270 is periodically simulated by the operation of the switch 61 of the pulsating relay 75, creating a short-circuit between the rails 268 and 270 through conductors 274 and 276 when the switch 61 engages the contact 63. When the switch 61 is open from the contact 63, however, the relay 75 becomes energized in the circuit traceable from the power source 278 through resistor 280 and conductor 274, along the track 268 to conductor 282, through the relay 75 and the resistor 284, by way of conductor 286 to the track 270, along the track 270 to the conductor 276, and along the conductor 276 back to the source 278. The load-control relay is held energized during the pulsations of the relay 75, as has previously been described in other embodiments of the invention. So long as the load-control relay is not energized, which condition indicates a failure in the track detector section or in the control circuits, or the existence of a train upon the track section 268, 270, the switch 95 will engage the contact 97 and energize a signal-post red signal indicator light or lamp 300 and, if desired, an auxiliary test red signal lamp 300'. The lamp 300 is energized from the source B+, B— in the circuit traceable from the B— terminal along conductor 302 to the switch 95, through the switch 95 and the contact 97 by way of conductor 304 to the lamp 300, and by way of conductor 306 to the B+ terminal. Upon energization of the load-control relay 89, however, the switch 95 engages the contact 107, energizing the green indicator lights or lamps 288 and 288' by way of conductors 308 and 306. Manual testing may, if desired, be provided by the dotted track-short-circuiting conductors 310 and the switch 312.

Fig. 16 illustrates a system just like that of Fig. 15, but embodying still a further safeguard. If a first train is on the train detection track section 268, 270, and another train approaches the same, the signal post will show a red light 300, as before described. When the first train leaves the detection section 268, 270, the red light 300 will extinguish and the green lamp 288 will become illuminated. This change of light, of course, signifies that the detection section 268, 270 is cleared and that the second train may proceed upon it. Even though, however, a green light is showing, some doubt may exist in the mind of the engineer of the second train as to whether or not the system is actually working, and whether or not his speed should be reduced before entering the detection section 268, 270. The system of Fig. 16, therefore, provides for an automatic test of the signalling system when the second train contacts a test section of track 314, 316, in advance of the detection section 268, 270. Upon the second train's entering the test section 314, 316, the rails 314 and 316 become short-circuited applying the voltage of a source 318 to a further relay winding 320. The relay 320 is of the slow-operating, momentary contact type. In operating, its armature 322 moves a contact member 324 from the solid to the dotted-line position, momentarily connecting contacts 326 and 328 through the member 324 during its upward movement. This momentary contact short circuits the rails in the detection section 268, 270 by connecting conductors 274 and 276 together. This de-energizes the pulsating relay 75 and, in turn, de-energizes the load-control relay 89. The duration of time in which contacts 326 and 328 are connected is predetermined to provide a sufficient length of time to permit the relay 89 to release. In releasing, of course, the green lamp 288 is extinguished and the red lamp 300 is lit. Relay 320 continues to move the contact 324 slowly upwards to the dotted-line position, removing the short-circuit on the rails 268, 270 and causing both the relays 75 and 89 to operate, thereby extinguishing the red lamp 300 and causing the green lamp 288 to light. This indicates to the engineer that the track section 268, 270 ahead has been automatically tested and that the entire signalling system is working properly so that he may safely proceed. By predetermining the length of the automatic test section of track 314, 316, as well as location of the signal light post, a train may thus proceed without reducing speed and the engineer has the assurance of personally seeing the signalling system tested immediately prior to his entrance on the detection or sensing section 268, 270.

As a final illustration of the wide versatility of the techniques herein disclosed, Fig. 17 illustrates their application to a radio-active particle detector. The technique is applicable, for example, to such devices as radiation counters, radioactive contamination determining devices, reactor controls, radiation instrumentation, and other similar apparatus. The necessity for absolute and automatic fail-safe operation of such devices is, of course, of very great importance. A radiation-sensing detector, such as a counter or indicator of any desired type, is illustrated at 330, connected to the input of any desired conventional electronic or other equipment 332 embodying, for example, counting, triggering or amplifying circuits, as is well known. The pulsating relay 75 is shown connected in the output-circuit of the equipment 332 and cooperative with the load-control relay 89, before discussed in detail. Periodic checking of the operability of the sensing or detecting element 330 is effected by periodically energizing the solenoid winding 334 through the switch 61 and the contact 63, as before described in connection, for example, with the energization of the solenoid 37 of Fig. 1. The energization of the solenoid 334 will actuate its armature 336 in opposition to the restoring spring 344, to slide open the lid 338 of a lead or other radio-activityinsulating container 340, exposing the sensing element 330 to the radiations of predetermined radioactive count of a radioactivity-producing source X within the container 340. The lid 338 acts as a control device for regulating the amount of radioactive radiation emanating from the source X. Exposure of the source X to a predetermined degree by the operation of the lid control device 338 thus simulates the actual radio-activity condition that the sensing element 330 must be continually operative to detect. An indicator lamp 109 connected to the contact 97 of the load-control relay 89 may indicate failure of the sensing element 330, the equipment 332 or the checking circuits, or the actual presence of excessive radioactive radiation. The lamp 109' connected to the contact 107, on the other hand, will indicate operability of the system and the lack of the presence of radioactivity. Further controls may be operated by the load-control relay as heretofore described in connection with other figures. A further indicator 342 may be provided for becoming energized upon the closure of a switch S1 and an auxiliary contact 63' which the switch 61 may engage upon energization of the relay 75. So long as the relay 75 pulsates, the lamp 342 will blink. Steady illumination of the lamp 342, however, will indicate that excessive radioactivity is present.

If, moreover, the sensitivity of the radiation detector 330 should drop or otherwise drift, as occurs with such detectors as Geiger-Mueller counters, the present invention permits an automatic detection of the loss of sensitivity below any desired predetermined radiation limit. In the case of monitoring the radioactivity carried by personnel, for example, the source X may be selected to have a radioactivity count that simulates the sum of the average radioactivity background count, caused by stray and natural radiation at the counter location, and the additional permissible or safe radiation count that can be tolerated on the person of the working personnel. Compensation for background or ambient radiation can easily be effected by adjustment of the detector sensitivity, the counting circuits and other well-known controls. If, as another example, this technique were applied to a nuclear reactor control system with the radiation sensing element 330 monitoring the radiation within the reactor, the solenoid plunger 344 might operate upon one or more of the control rods that control the degree of activity within the reactor in accordance with the position of the control rod, as is well known. The periodic oscillation of the control rod would permit a continual fail-safe check upon the operating condition of the reactor and the monitoring system as well. If, for example, the reactor became too radioactive or critical, the system would maintain the solenoid 334 de-energized, to maintain the control rod in the necessary position to prevent a runaway condition. It should thus be clear that the technique of the present invention is adaptable to any type of radiation detector, control, instrument, or other system, just as it has universal adaptability to a wide variety of other types of electromagnetic, electric, electronic, electro-mechanical and mechanical systems, as before explained.

Further modifications will occur to those skilled in the art, and all such are considered to fall within the spirit and scope of the present invention as defined in the appended claims.

What is claimed is:

1. Apparatus of the character described having, in combination, an electric system adapted to support energized and de-energized states, a detector for detecting the occurrence of a predetermined event, means for connecting the detector with the electric system to cause the electric system to support one of its said states upon the detection by the detector of the occurrence of the predetermined event and the other of its said states in the absence of the said predetermined event, means controlled by the operation of the system for repetitively simulating the occurrence of the said predetermined event in order to cause the detector repetitively to detect the same and the system repetitively to alternate between its said states, thereby to produce a checking signal, and means responsive to the checking signal for indicating the loss of the same.

2. Apparatus of the character described having, in combination, means for supplying electric energy, a load, switching means cooperative with the energy-supplying means and the load to enable the load to support energized and de-energized states in response to operation of the switching means, a detector for detecting the occurrence of a predetermined event, means for connecting the detector with the switching means to actuate the same in order to cause the load to support one of its said states upon the detection by the detector of the occurrence of the predetermined event and the other of its said states in the absence of the said predetermined event, means controlled by the switching means for repetitively simulating the occurrence of the said predetermined event in order to cause the detector repetitively to detect the same and repetitively to actuate the switching means, thereby to produce a repetitive checking signal in the load, and means responsive to the load for indicating the loss of the checking signal therein.

3. Apparatus of the character described having, in combination, means for supplying electric energy, energy-storage means, a load-control relay, relay-controlled switching means for connecting the energy-supplying means to the energy-storage means in one position in order to store energy and for connecting the energy-storage means to the load-control relay in another position in order to deliver the stored energy to the load-control relay, thereby to cause the load-control relay to support energized and de-energized states in response to the operation of the switching means, a detector for detecting the occurrence of a predetermined event, means for connecting the detector with the relay-controlled switching means to actuate the same in order to cause the load-control relay to support one of its said states upon the detection by the detector of the occurrence of the predetermined event and the other of its said states in the absence of the said predetermined event, means controlled by the relay-controlled switching means for repetitively simulating the occurrence of the said predetermined event in order to cause the detector repetitively to detect the same and repetitively to actuate the relay-controlled switching means, thereby to produce a repetitive checking signal in the load-control relay, the rate or rates of repetition being adjusted sufficiently high continuously to maintain the load-control relay in one of its said states so long as the checking signal is produced, and means responsive to the load-control relay for indicating the loss of the checking signal therein.

4. Apparatus of the character described having, in combination, means for supplying electric energy, energy-storage means, a load-control relay, relay-controlled switching means for connecting the energy-supplying means to the energy-storage means in one position in order to store energy and for connecting the energy-storage means to the load-control relay in another position in order to deliver the stored energy to the load-control relay, thereby to cause the load-control relay to support energized and de-energized states in response to the operation of the switching means, a detector for detecting the occurrence of a predetermined event, means for connecting the detector with the relay-controlled switching means to actuate the same in order to cause the load-control relay to support one of its said states upon the detection by the detector of the occurrence of the predetermined event and the other of its said states in the absence of the said predetermined event, means comprising a solenoid controlled by the relay-controlled switching means for repetitively simulating the occurrence of the said predetermined event in order to cause the detector repetitively to detect the same and repetitively to actuate the relay-controlled switching means, thereby to produce a repetitive checking signal in the load-control relay, the rate or rates of repetition being adjusted sufficiently high continuously to maintain the load-control relay in one of its said states so long as the checking signal is produced, and means responsive to the load-control relay for indicating the loss of the checking signal therein.

5. Apparatus of the character described having, in combination, an electric system adapted to support energized and de-energized states, a fluid-level detector for detecting when a fluid medium reaches a predetermined level, means for connecting the detector with the electric system to cause the electric system to support one of its said states upon the detection by the detector that the fluid medium has reached the said predetermined level and the other of its said states when the fluid medium is at other levels, means for repetitively simulating the reaching of the said predetermined level by the fluid in order to cause the detector repetitively to detect the same and the system repetitively to alternate between its said states, thereby to produce a checking signal, and means responsive to the checking signal for indicating the loss of the same.

6. Apparatus of the character described having, in combination, an electric system adapted to support energized and de-energized states, a fluid-level detector comprising a float for detecting when a fluid medium reaches a predetermined level, means for connecting the detector with the electric system to cause the electric system to support one of its said states upon the detection by the detector that the fluid medium has reached the said predetermined level and the other of its said states when the fluid medium is at other levels, means for repetitively displacing the float to simulate the reaching of the said predetermined level by the fluid in order to cause the detector repetitively to detect the same and the system repetitively to alternate between its said states, thereby to produce a checking signal, and means responsive to the checking signal for indicating the loss of the same.

7. Apparatus of the character described having, in combination, an electric system adapted to support energized and de-energized states, a fluid-level detector comprising an electric probe for detecting when a fluid medium reaches a predetermined level, means for connecting the detector with the electric system to cause the electric system to support one of its said states upon the detection by the detector that the fluid medium has reached the said predetermined level and the other of its said states when the fluid medium is at other levels, means for repetitively displacing the electric probe to simulate the reaching of the said predetermined level by the fluid in order to cause the detector repetitively to detect the same and the system repetitively to alternate between its said states, thereby to produce a checking signal, and means responsive to the checking signal for indicating the loss of the same.

8. Apparatus of the character described having, in combination, an electric system adapted to support energized and de-energized states, a fluid-level detector comprising an electric probe for detecting when a fluid medium reaches a predetermined level, means for connecting the detector with the electric system to cause the electric system to support one of its said states upon the detection by the detector that the fluid medium has reached the said predetermined level and the other of its said states when the fluid medium is at other levels, means for repetitively displacing the fluid medium to simulate the reaching of the said predetermined level by the fluid in order to cause the detector repetitively to detect the same and the system repetitively to alternate between its said states, thereby to produce a checking signal, and means responsive to the checking signal for indicating the loss of the same.

9. Apparatus of the character described having, in combination, means for supplying electric energy, energy-storage means, a load, switching means for connecting the energy-supplying means to the energy-storage means in one position in order to store energy and for connecting the energy-storage means to the load in another position in order to deliver the stored energy to the load, thereby to cause the load to support energized and de-energized states in response to the operation of the switching means, a fluid-level detector comprising a float and a further switching means actuated thereby when a fluid medium reaches a predetermined level, means for connecting the further switching means with the first-named switching means to actuate the same in order to cause the load to support one of its said states upon the detection by the detector that the fluid medium has reached the said predetermined level and the other of its said states when the fluid medium is at other levels, means for repetitively displacing the float and correspondingly actuating the further switching means to simulate the reaching of the said predetermined level by the fluid in order to cause the detector repetitively to detect the same and repetitively to actuate the switching means, thereby to produce a repetitive checking signal in the load, and means responsive to the load for indicating the loss of the checking signal therein.

10. Apparatus of the character described having, in combination, means for supplying electric energy, energy-storage means, a load, switching means for connecting the energy-supplying means to the energy-storage means in one position in order to store energy and for connecting the energy-storage means to the load in another position in order to deliver the stored energy to the load, thereby to cause the load to support energized and de-energized states in response to the operation of the switching means, a fluid-level detector comprising a float and a further switching means actuated thereby for detecting when a fluid medium reaches a predetermined level, means for connecting the further switching means with the first-named switching means to actuate the same in order to cause the load to support one of its said states upon the detection by the detector that the fluid medium has reached the said predetermined level and the other of its said states when the fluid medium is at other levels, means controlled by the first-named switching means for repetitively displacing the float and correspondingly actuating the further switching means to simulate the reaching of the said predetermined level by the fluid in order to cause the detector repetitively to detect the same and repetitively to actuate the switching means, thereby to produce a repetitive checking signal in the load, the rate or rates of repetition being adjusted sufficiently high continuously to maintain the load in one of its said states so long as the checking signal is produced, and means responsive to the load for indicating the loss of the checking signal therein.

11. Apparatus as claimed in claim 10 and in which the indicating means comprises means for controlling a fluid-level cut-off system.

12. A fluid-level control having, in combination, a container for fluid, a float, a switching mechanism operable to two positions in response to movement of the float to two predetermined limits within the container, a system adapted to support an energized state in one of the positions of the switching mechanism, and a de-energized state in the other position, and means controlled in accordance with the energized and de-energized states of the system for moving the float to one of the said predetermined limits in one of the said states and for permitting movement of the float to the other predetermined limit in the other of the said states.

13. A limit control having, in combination, a limit switching mechanism operable from one position to a second position in response to the reaching of a predetermined limit, an electric circuit adapted to support an energized state in one of the positions of the switching mechanism and a de-energized state in the other position, and means controlled in accordance with the energized and de-energized states of the electric circuit for simulating the reaching of the said predetermined limit and moving the switching mechanism to one of the said positions in one of the said states and for permitting the movement of the switching mechanism to the other position in the other of the said states.

14. Apparatus for continually checking a detector and associated system that is to detect the occurrence of a predetermined event, that comprises means for subjecting the detector to repetitive simulations of the occurrence of the said predetermined event, means for alternately energizing and de-energizing the system synchronously with the repetitive simulations, means for monitoring the alternate energizing and de-energizing of the system, and means for indicating the cessation of such alternations.

15. Apparatus for continually checking a detector and associated system that is to detect the occurrence of a predetermined event, that comprises, means for alternately energizing and de-energizing the system, means for subjecting the detector to repetitive simulations of the occurrence of the said predetermined event, means for controlling the repetition of the simulations by the alternate energizing and de-energizing of the system to effect synchronization therebetween, means for monitoring the alternate energizing and de-energizing of the system, and means for indicating the cessation of such alternations.

16. Apparatus for continually checking a fluid-level detector and associated system that is to detect the reaching by a fluid medium of a predetermined fluid level, that comprises, means for repetitively relatively displacing the detector and the fluid medium to a degree sufficient repetitively to simulate the reaching of the predetermined fluid level, means for alternately energizing and de-energizing the system synchronously with the repetitive simulations, means for monitoring the alternate energizing and de-energizing of the system, and means for indicating the cessation of such alternations.

17. Apparatus for continually checking a limit detector and associated system that is to detect the reaching of a predetermined limit, that comprises, means for subjecting the detector to repetitive simulations of the reaching of the predetermined limit, means for alternately energizing and de-energizing the system synchronously with the repetitive simulations, and means for monitoring the alternate energizing and de-energizing of the system.

18. Apparatus as claimed in claim 14 and in which the said system is an electric system adapted to be energized upon the detection by the detector of the occurrence of the said predetermined event and relatively de-energized in the absence of the said predetermined event.

19. Apparatus as claimed in claim 14 and in which the said indicating means is operable to indicate the said cessation of the alternations only after the cessation has continued for a time greater than the period or periods of the said alternations.

20. Apparatus as claimed in claim 14 and in which the said system is an electric system comprising means for supplying electric energy, a load, and switching means cooperative with the energy-supplying means and the load to enable the load to support energized and relatively de-energized states in response to operation of the switching means, and means is provided for actuating the switchings means as the detector detects the occurrence and absence of the said predetermined event.

21. Apparatus as claimed in claim 20 and in which the said switching means is relay-controlled and the said detector is connected with the relay-controlled switching means to actuate the same.

22. Apparatus as claimed in claim 20 and in which the said indicating means is operable to indicate the said cessation of the alternations only after the cessation has continued for a time greater than the period or periods of the said alternations, the rate or rates of the said alternations being sufficiently high continuously to maintain the load in one of its said states so long as the said alternations are produced.

23. Apparatus as claimed in claim 20 and in which energy-storage means is provided in the said electric system as is means for enabling the switching means to connect the said energy-supplying means to the energy-storing means in one position in order to store energy and to connect the energy-storage means to the load in another position in order to deliver the stored energy to the load.

24. Apparatus as claimed in claim 23 and in which the load comprises a load-control relay, the rate or rates of repetition of the said alternations being sufficiently high continuously to maintain the load-control relay in one of the said load states so long as the said alternations are produced.

25. Apparatus as claimed in claim 14 and in which the said detector is a condition-sensor for sensing the occurrence of a predetermined condition.

26. Apparatus as claimed in claim 14 and in which the said detector is a radiation detector for detecting the occurrence of predetermined radiation.

27. Apparatus as claimed in claim 14 and in which the said detector is a temperature detector for detecting the occurrence of a predetermined temperature.

28. Apparatus as claimed in claim 14 and in which the said detector is a railroad-track-section train detector for detecting the event of the presence of a train upon the track section.

29. Apparatus as claimed in claim 28 and in which a further track section is provided previous to the first-named track section for producing a momentary simulation of the presence of a train upon the first-named track section.

30. Apparatus as claimed in claim 14 and in which the said detector is a light-wave detector for detecting the occurrence of predetermined light-wave energy.

31. Apparatus as claimed in claim 14 and in which the said detector is a radiation detector for detecting the occurrence of predetermined radiation, and there is provided means for producing radiation and means comprising a control device for repetitively varying the amount of radiation from the radiation-producing means to simulate repetitively the occurrence of the said predetermined radiation.

References Cited in the file of this patent

UNITED STATES PATENTS

| | | |
|---|---|---|
| 2,455,351 | Beam et al. | Dec. 7, 1948 |
| 2,605,334 | Hines | July 29, 1952 |
| 2,643,370 | Lawrence | June 23, 1953 |
| 2,649,538 | Marlowe et al. | Aug. 18, 1953 |
| 2,659,880 | Dodd | Nov. 17, 1953 |